US011143046B2

(12) United States Patent
Martin (10) Patent No.: US 11,143,046 B2
(45) Date of Patent: Oct. 12, 2021

(54) SEAL RUNNER AND METHOD (71) Applicant: PRATT & WHITNEY CANADA CORP., Longueuil (CA)

(72) Inventor: Bruno Martin, Saint-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 59 days.

(21) Appl. No.: 16/587,478

(22) Filed: Sep. 30, 2019

(65) Prior Publication Data

US 2021/0095570 A1  Apr. 1, 2021

(51) Int. Cl.
| F01D 11/00 | (2006.01) |
| F01D 25/16 | (2006.01) |
| F01D 25/18 | (2006.01) |

(52) U.S. Cl.
CPC ............ F01D 11/003 (2013.01); F01D 25/16 (2013.01); F01D 25/183 (2013.01); F05D 2220/32 (2013.01); F05D 2240/50 (2013.01); F05D 2240/55 (2013.01)

(58) Field of Classification Search
CPC .... F01D 11/003; F01D 11/005; F01D 11/008; F01D 25/16; F01D 25/183; F05D 2220/32; F05D 2240/50; F05D 2240/55
See application file for complete search history.

(56) References Cited

U.S. PATENT DOCUMENTS

| 4,406,459 A * | 9/1983 | Davis .................. F16J 15/3404 |
| | | 277/401 |
| 7,699,530 B2 * | 4/2010 | Blais .................... F16C 35/042 |
| | | 384/462 |
| 8,113,771 B2 * | 2/2012 | Turnquist .............. F01D 11/025 |
| | | 415/173.3 |
| 8,888,441 B2 * | 11/2014 | Jordy ................... F01D 11/025 |
| | | 415/111 |
| 9,327,368 B2 * | 5/2016 | Hagan ....................... F02C 7/28 |
| 9,631,508 B2 * | 4/2017 | Blais ..................... F01D 11/003 |
| 9,771,870 B2 * | 9/2017 | Dierksmeier ........... F01D 5/147 |
| 10,190,429 B2 | 1/2019 | Garrison |
| 10,316,974 B2 | 6/2019 | Webster et al. |
| 2016/0153300 A1 | 6/2016 | Carrieres |

OTHER PUBLICATIONS

Guoqing Li, Qian Zhang, Zhijun Lei, Enliang Huang, Hongwei Wu, Gang Xu «Leakage performance of labyrinth seal for oil sealing of aero-engine», Propulsion and Power Research, vol. 8, Issue 1, 2019, pp. 13-22, ISSN 2212-540X (https://www.sciencedirect.com/science/article/pii/S2212540X18300750).

* cited by examiner

*Primary Examiner* — Shafiq Mian
(74) *Attorney, Agent, or Firm* — Norton Rose Fulbright Canada LLP (57) ABSTRACT

A seal runner assembly for a gas turbine engine includes a non-rotational annular wear seal, and an annular seal runner having an annular body defining an annular front face contacting the wear seal, the annular body defining an aperture extending axially through the seal runner, the aperture configured for receiving therein a part of a shaft of the gas turbine engine, the seal runner having a plurality of axially-extending slots at locations that are distributed around a wall of the seal runner that extends circumferentially about at least a portion of the annular front face and extends from the front face in a direction away from the wear seal. A method for sealing a gap between a part of a machine and a rotatable shaft of the machine is also provided.

20 Claims, 8 Drawing Sheets

SEAL RUNNER AND METHOD

TECHNICAL FIELD

The technology relates generally to aircraft engines, and more particularly to seals for rotating components in a gas turbine engine.

BACKGROUND

Contact seals, often called carbon seals, are commonly used to provide a fluid seal around a rotating shaft, particularly high speed rotating shafts used in high temperature environments such as in gas turbine engines. Prior art contact seals are usually suitable for their intended purposes. However, in some operating conditions of some applications, such as aircraft engine applications, gearbox applications, and starter/alternator applications for example, prior art contact seals may become deformed, with possible consequences being premature failure, leakage, and the like.

Accordingly, improved shaft contact seals are sought.

SUMMARY

In one aspect, there is provided a seal runner assembly for a gas turbine engine, comprising: a non-rotational annular wear seal; and an annular seal runner having an annular body defining an annular front face contacting the wear seal, the annular body defining an aperture extending axially through the seal runner, the aperture configured for receiving therein a part of a shaft of the gas turbine engine, the seal runner having a plurality of axially-extending slots at locations that are distributed around a wall of the seal runner that extends circumferentially about at least a portion of the annular front face and extends from the front face in a direction away from the wear seal.

In some embodiments, the wall is an annular wall that defines a circumferential slot extending: a) circumferentially in the annular wall, and b) radially through the annular wall.

In some embodiments, the circumferential slot is disposed between an adjacent pair of the axially-extending slots, and the axially-extending slots are open at a rear face of the annular body, the rear face being opposite the front face.

In some embodiments, the circumferential slot is a plurality of circumferential slots that define in the annular wall at least one of: axially-extending ribs, and circumferentially-extending ribs.

In some embodiments, a given axially-extending rib of the axially-extending ribs is disposed between a pair of adjacent axially-extending slots of the axially-extending slots, and a given circumferentially-extending rib of the circumferentially-extending ribs connects a portion of the seal runner defining a first axially-extending slot of the pair of adjacent axially-extending slots to a portion of the seal runner defining a second axially-extending slot of the pair of adjacent axially-extending slots.

In some embodiments, the circumferentially-extending ribs define a rear face of the seal runner.

In some embodiments, the seal runner has a depth that is orthogonal to and extends axially between the front face and the rear face, and the axially-extending slots have an axial length that is between 20% and 70% of the depth.

In some embodiments, portions of the annular wall of the seal runner defining the axially-extending slots are radially-inwardly offset relative to portions of the annular wall of the seal runner defining the circumferential slots.

In some embodiments, a given axially-extending slot of the axially-extending slots is one of: U-shaped, V-shaped, and rectangular.

In some embodiments, the axially-extending slots are equidistantly spaced relative to each other around the circumference of the seal runner, and the circumferential slots are equidistantly spaced relative to each other around the circumference of the seal runner.

In another aspect there is provided a machine, comprising: a shaft rotatable about a rotation axis relative to a part of the machine; a non-rotational annular wear seal; and an annular seal runner having an annular body defining an annular front face contacting the wear seal, the annular body defining an aperture extending axially through the seal runner, the aperture receiving the shaft therein, the seal runner defining therein a plurality of axially-extending slots at locations that are distributed around a circumference of the seal runner, the axially-extending slots matingly receiving respective parts of the shaft therein.

In some embodiments, the annular seal runner includes a circumferential wall extending at least in part around the shaft and defines a circumferential slot in the circumferential wall, the circumferential slot extending: a) circumferentially in the circumferential wall, and b) radially through the circumferential wall.

In some embodiments, at least a part of the annular seal runner is mounted over the shaft coaxially with the shaft, and further comprising an annular seal disposed between the at least a part of the annular seal runner and the shaft.

In some embodiments, the machine includes axially-extending ribs disposed between the axially-extending slots.

In some embodiments, the annular seal runner includes a rear face opposite the front face, and the axially-extending slots are open at the rear face.

In some embodiments, the machine includes ribs extending circumferentially between the axially-extending slots.

In some embodiments, the circumferential slot is a plurality of circumferential slots, a given circumferential slot of the circumferential slots being disposed between adjacent ones of the axially-extending slots.

In some embodiments, at least a part of the circumferential wall defines a space between a radially outer surface of the shaft and the part of the circumferential wall.

In another aspect there is provided a method for sealing a gap between a part of a machine and a rotatable shaft of the machine, comprising: rotating the shaft; contacting a front annular face of a seal runner against a wear seal to seal the gap; and spreading a load on the seal runner from the shaft via annular segments of the seal runner extending at least in part around the shaft and separated by slots.

In some embodiments, the method includes unstiffening the front annular face of the seal runner with the axially-oriented slots.

In yet another aspect, there is provided a method of manufacturing a seal runner, comprising: forming an annular body having a planar annular front face and an annular rear face opposite the front face, forming in the annular body a plurality of axially-extending slots open at the rear face and distributed at equidistant locations about a circumference of the annular body, and forming in the circumference of the annular body a plurality of circumferential slots between adjacent ones of the axially-extending slots and extending: a) circumferentially in the annular body, and b) radially through the annular body.

In some embodiments, the method of manufacturing comprises defining a groove in a radially inner surface of the annular body, the groove extending circumferentially around the radially inner surface.

Further details of these and other aspects of the present technology will be apparent from the detailed description and figures included below.

BRIEF DESCRIPTION OF THE DRAWINGS

Reference is now made to the accompanying figures depicting aspects of the present technology, in which.

DETAILED DESCRIPTION

Figure 1:
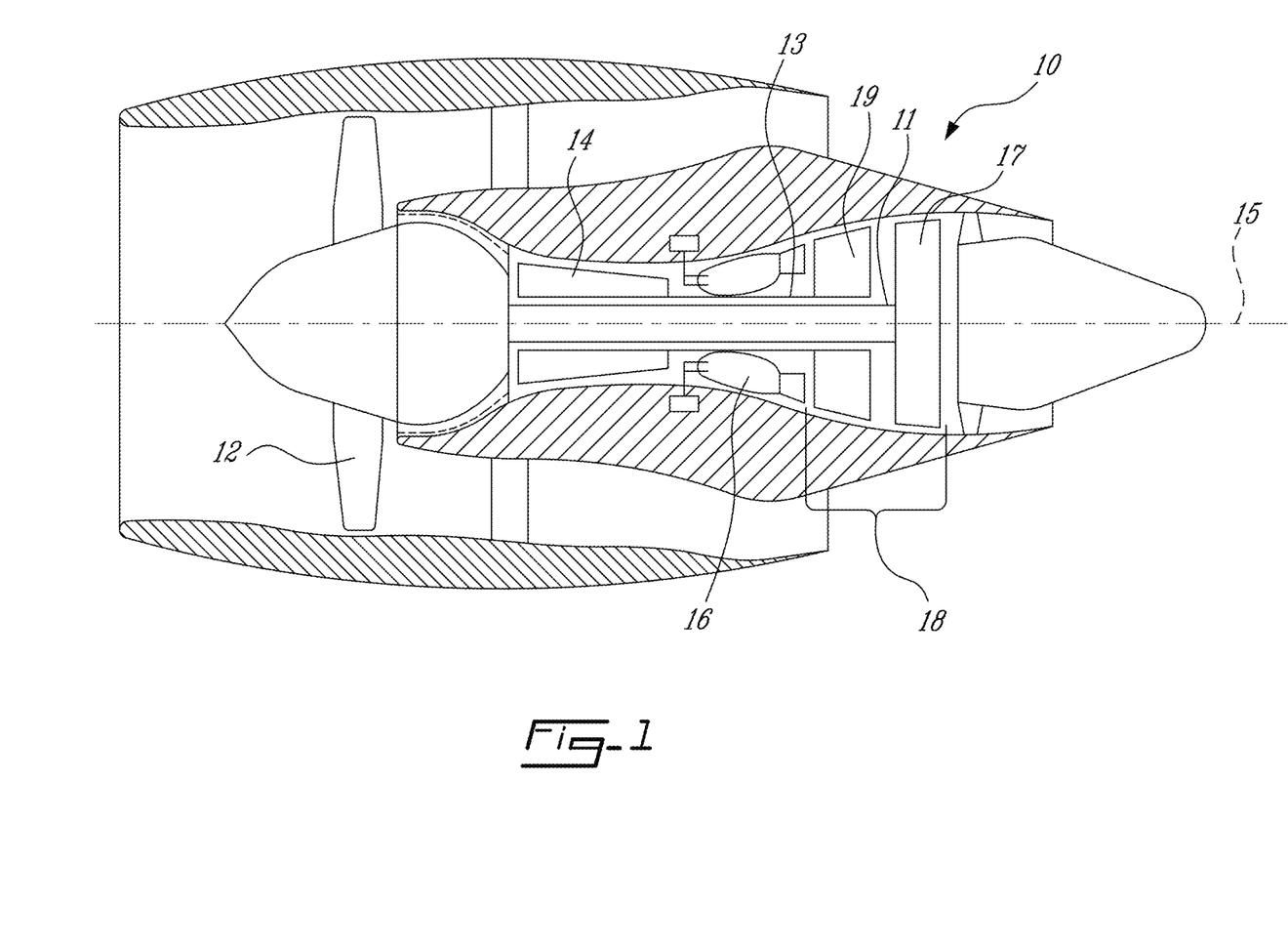
FIG. 1 is schematic cross-section of a gas turbine engine.

The present technology is illustrated herein as being used with a gas turbine engine 10, shown in FIG. 1. However, the gas turbine engine 10 is a non-limiting example of a machine having a rotatable shaft with respect to which the present technology may be used. The present technology may likewise be used with respect to other shaft(s) of the engine 10 and/or with respect to other types of machine having a rotatable shaft, and/or with respect to other applications. For example, in some embodiments the present technology may be implemented in a starter/alternator, a gearbox, or other machine having a rotating shaft. In some such cases, the shaft(s) may be sealed by a prior art contact seal assembly for example. In some such cases, a contact seal assembly according to the present technology may replace the prior art contact seal assembly. In some such cases, a seal runner according to the present technology may replace a prior art seal runner of the prior art contact seal assembly.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

In the depicted embodiment, the turbine section 18 comprises a low pressure turbine 17 and a high pressure turbine 19. The engine 10 also preferably includes at least two rotating main engine shafts, namely a first inner shaft 11 interconnecting the fan 12 with the low pressure turbine 17, and a second outer shaft 13 interconnecting the compressor 14 with the high pressure turbine 19. The inner and outer main engine shafts 11 and 13 are concentric and rotate about the centerline axis 15 which is preferably collinear with their longitudinal axes.

Figure 2:
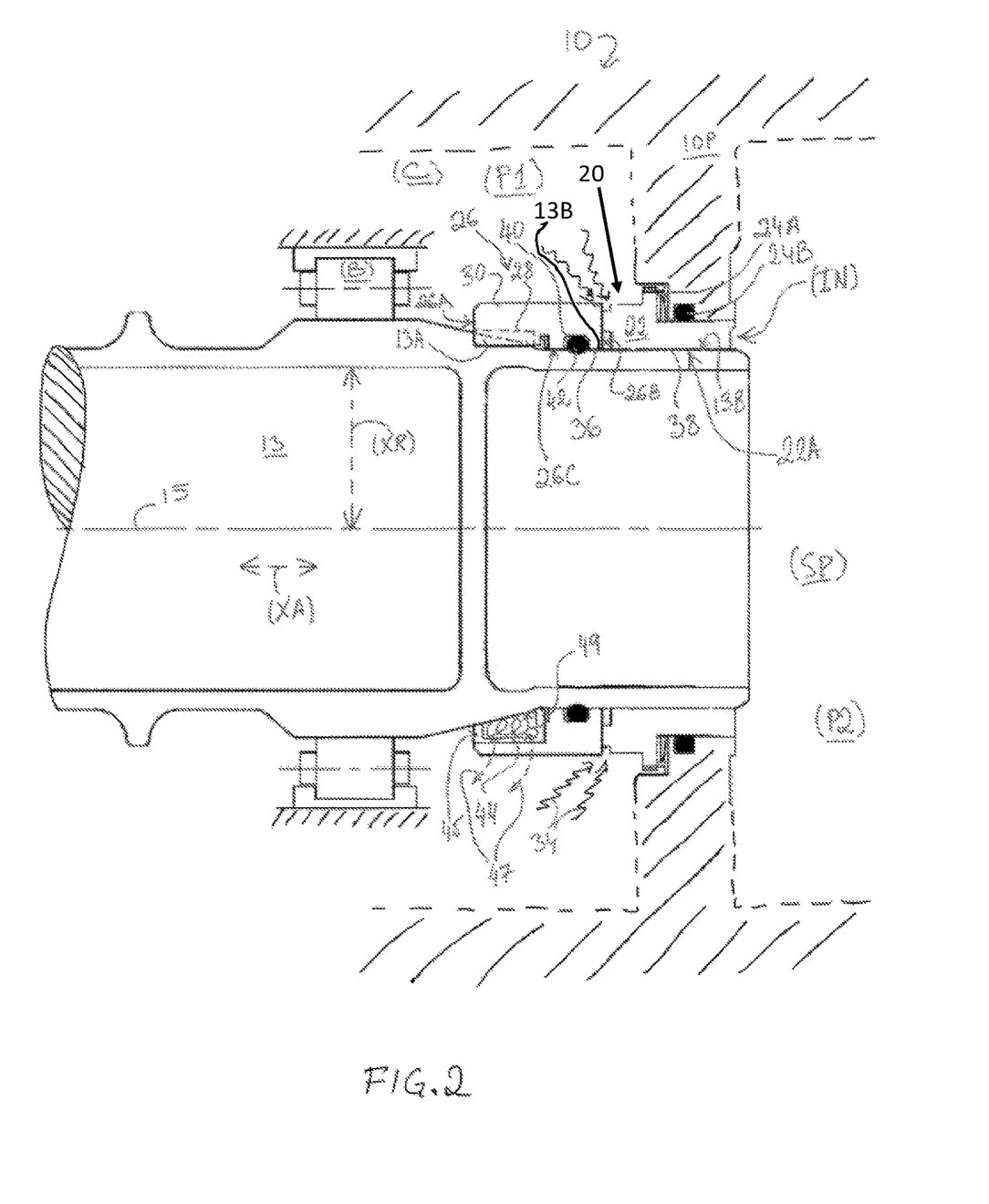
FIG. 2 is a partial schematic cross-section taken through a shaft of the gas turbine engine of FIG. 1, the shaft being engaged with a contact seal assembly.

The main engine shafts 11, 13 may be supported at one or more points by one or more bearings (B), and may extend through one or more cavities (C). One of the one or more bearings (B) and one of cavities (C) are shown in FIG. 2. Referring to FIG. 2, depending on the particular application of the present technology, a gap (IN) between a given shaft, such as the shaft 13 in this non-limiting example, and a structure defining a given cavity (C) associated with the shaft 13 may need to be fluidly sealed.

As a non-limiting example, the gap (IN) may lead from the given cavity (C) to another space (SP), which may be for example another cavity that may be part of the engine/machine 10 or may be part of a component or other machine connected to the engine/machine 10. As another non-limiting example, the other space (SP) may be the atmosphere or a space that is open to atmospheric pressure. In some embodiments, the given cavity (C) may be under a pressure (P1) that may be greater or lower than a pressure (P2) of the space (SP) from which the given cavity (C) may need to be sealed.

For sealing the given cavity (C) from the other space(s) (SP), one or more contact seal assemblies 20 may be provided. In the present non-limiting application in the engine 10, the one or more contact seal assemblies 20 may be provided to ensure sealing about the shaft(s) 11, 13 of the engine at several points along their respective lengths to prevent unwanted fluid leaking from one engine cavity to another. For example, compressed air in a main engine gas path of the engine 10 may be kept separate from secondary cooling air or bearing lubrication oil in bearing cavities and cooling cavities of the engine 10 that may be adjacent to the main engine gas path.

Referring to FIG. 2, an example of the one or more contact seal assemblies 20 is shown as sealing the gap (IN) defined between the shaft 13 of the engine 10 and a part 10P of the engine 10 defining a given cavity (C) of the engine 10, through/into which the shaft 13 extends as shown. In this embodiment, the contact seal assembly 20 includes a wear seal 22 that is mounted in a fixed position relative to and proximate to the shaft 13. The wear seal 22 may be a carbon seal, and is hence referred to herein as carbon seal 22, but may be made of other materials that may wear at a greater rate than a seal runner which rubs against the wear seal 22. Stated otherwise, in this embodiment the carbon seal 22 does not rotate with the shaft 13 about the rotation axis 15. In this embodiment, and although not necessarily the case in other embodiments, the carbon seal 22 is annular and received at least in part over the shaft 13.

In this embodiment, and although not necessarily the case in other embodiments, the carbon seal 22 is connected to the engine/machine 10 via a spring 24A and an annular seal 24B. The spring 24A biases the carbon seal 22 as described below. An alternative to the spring 24A may be a magnetic arrangement with a permanent magnet and ferromagnetic component, for example. The annular seal 24B helps create a fluidly sealed gap between the engine/machine 10 and a radially outward surface of the carbon seal 22. In other embodiments, a different interconnection may be used. Anti-rotation features, such as pin and groove, pin and slot, etc, may be present to ensure that the carbon seal 22 does not rotate relative to the structure while in at least some embodiments having the capability of translating as a response to the biasing.

The carbon seal 22 may be conventional. For example, the carbon seal 22 may include one or more carbon ring segments which form a circumferentially interrupted annular carbon ring assembly. The carbon ring segments 22 may be arcuate and/or stacked carbon segments which may be circumferentially arranged around a respective portion of the shaft 13 and/or at least proximate to the shaft 13. Each particular embodiment of the carbon seal 22 may be selected to suit each particular embodiment of the engine/machine 10 and/or each particular shaft with respect to which the contact seal assembly 20 may be used.

Figure 3A:
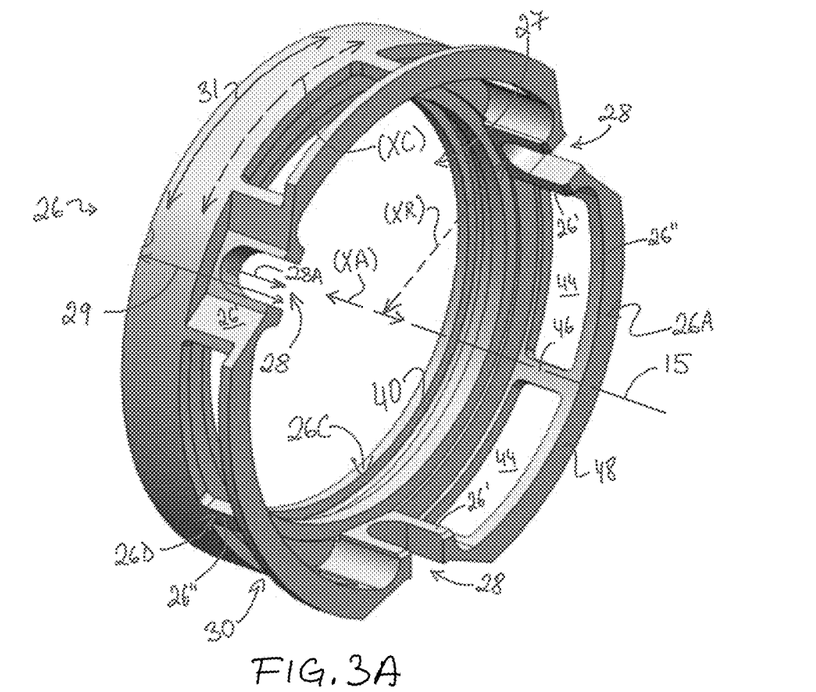
FIG. 3A is a perspective view of a seal runner of the contact seal assembly of FIG. 2.
Figure 3B:
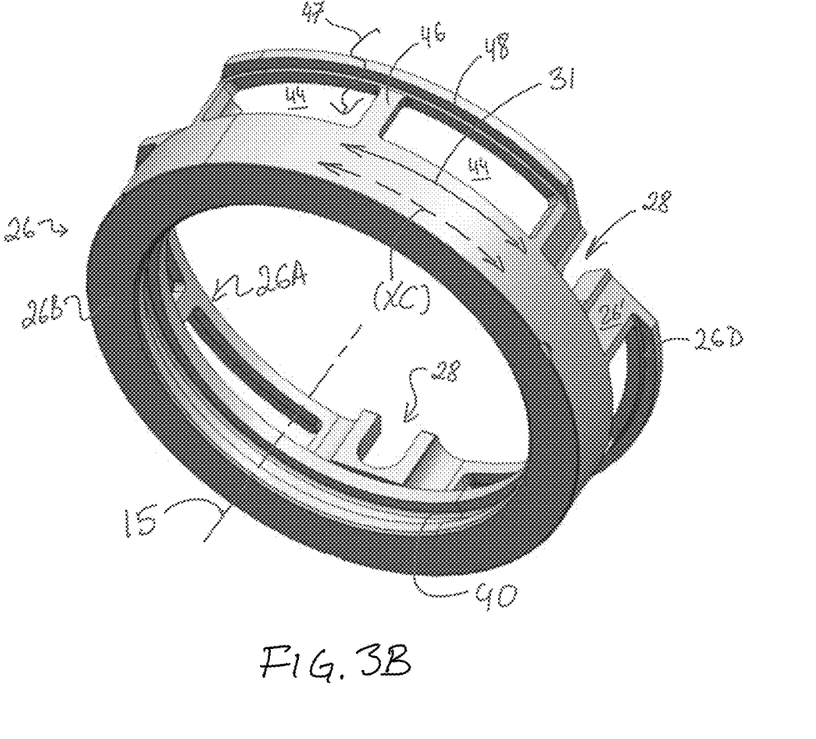
FIG. 3B is another perspective view of the seal runner of FIG. 3A.

Referring still to FIGS. 2 to 3B, the contact seal assembly 20 further includes a seal runner 26. As best shown in FIGS. 3A and 3B, in this embodiment and although not necessarily the case in other embodiments, the seal runner 26 is annular, formed of an annular body having an axial aperture 27 that extends axially (i.e. in an axial direction (XA)) through the seal runner 26, and a circumferential wall 30 that extends circumferentially about at least a portion of a front face 26B of the seal runner 26, and in this embodiment extends around an entirety of the aperture 27. The wall 30 extends from a front face 26B of the seal runner 26 in a direction away from the wear seal 22. In this embodiment, the direction is axial relative to the rotation axis 15. In this embodiment, the axial aperture 27 is coaxial with the shaft 13 when the seal runner 26 is in use.

In this embodiment, the seal runner 26 is defined by a single-piece body which may be made using for example conventional material(s) and manufacturing method, such as 3D printing, moulding and/or machining for example, which may be selected to suit each particular embodiment and application of the contact seal assembly 20. The single-piece body may be monolithic in an embodiment. In other embodiments, the seal runner 26 may be made from multiple interconnected parts using materials and manufacturing methods, which may be conventional, and which may be selected to suit each particular embodiment and application of the contact seal assembly 20.

As shown in FIG. 2, the seal runner 26 is fixed to the shaft 13 for rotation with the shaft 13 about the rotation axis 15, via one or more anti-rotation features. In this embodiment, and as best shown in FIGS. 3A and 3B, the one or more anti-rotation features include axially-extending slots 28 defined in the seal runner 26 and extending therein in the axial direction (XA). In the present embodiment, the axially-extending slots 28 are defined in the circumferential wall 30. As shown, the axially-extending slots 28 are distributed at equidistant locations about a circumference 31 of the seal runner 26. In this embodiment and although not necessarily the case in other embodiments, the axially-extending slots 28 are U-shaped, and are open at a rear face 26A of the seal runner 26. In some embodiments, the anti-rotation features may include additional elements for carrying out the functionality of the anti-rotation features as described herein.

The axially-extending slots 28 being open at the rear face 26A allows the seal runner 26 to be slid over a respective part of the shaft 13 such that respective parts 13A of the shaft 13, which may be suitably sized projections 13A for example, are received into and engage respective ones of the axially-extending slots 28. Stated otherwise, the axially-extending slots 28 may be shaped to receive therein and mateably engage respective parts of the shaft 13 to non-rotationally secure the seal runner 26 to the shaft 13.

For the purposes of this document, the term "axially-extending" with respect to a slot means that the slot extends at least sufficiently in the axial direction (XA) to define an abutment area that is sufficient to provide the mated engagement with the respective portion(s) of the shaft 13 received in that slot to non-rotationally secure the seal runner 26 with respect to the shaft 13. While the shape of the slots 28 may provide certain advantages, the axially-extending slots 28 may be sized and/or positioned and/or shaped differently than illustrated in the figures. For example, in some embodiments, one or more of the slots 28 may have an axial length 28A, and a width (unlabeled) in a circumferential direction (XC), with the width being greater than the axial length 28A. As another example, in some embodiments, one or more of the slots 28 may and/or the shaft 13 may be shaped differently, and/or at least some of the slots 28 may not be open at the rear face 26A.

Still referring to FIG. 2, the rear face 26A of the seal runner 26 is opposite the front face 26B of the seal runner 26. As best shown in FIG. 3B, the front face 26B in this embodiment is planar and annular. As shown, the seal runner 26 has a depth 29 that is orthogonal to and extends axially between the rear face 26A and the front face 26B. In this embodiment, the axially-extending slots 28 have an axial length 28A, only one of which has been labeled to maintain clarity, which are all equal to each other and are about 40% of the depth 29 of the seal runner 26. In some embodiments, the axially-extending slots 28 may have one or more differing length(s). In some embodiments, the length of a given axially-extending slot 28 may be between 20% and 70% of the depth 29 of the seal runner 26. While such arrangements of the axially-extending slots 28 may provide advantages in some applications, in other embodiments different arrangements/sizing may be used.

When the contact seal assembly 20 is assembled, as shown in FIG. 2, the front face 26B abuts the carbon seal 22 and forms a sealed rotational interface between the front face 26B and the carbon seal 22. The sealed rotational interface is in a generally radial plane relative to the centerline axis 15. In this embodiment, and although this may be different in other embodiments, the carbon seal 22 is biased against the front face 26B of the seal runner 26 by the spring 24A to help create and maintain the sealed rotational gap. When the shaft 13 and the seal runner 26 rotate about the rotation axis 15, the seal runner 26 rotates relative to the carbon seal 22 while maintaining the sealed rotational gap at least substantially impermeable to fluid(s) that may be present in the cavity (C) and/or space (SP) that are at least substantially fluidly separated by the contact seal assembly 20. As non-limiting examples, such fluid(s) may be one or more of air, coolant, lubricant, exhaust gases, and the like, depending on each particular application of the contact seal assembly 20.

As seen in FIG. 2, the sealed rotational gap in this embodiment is annular and disposed over the shaft 13. The sealed rotational gap thus prevents or at least limits ingress therethrough of fluid(s) that may be present in the cavity (C) at a given pressure (P1) and which may act on the sealed rotational gap as shown with arrows 34 into either of: i) a fixed interface between a radially inward surface 26C of the seal runner 26 and a radially outward surface 13B of the shaft 13, or ii) a rotational gap 38 between a radially inward surface 22A of the carbon seal 22 and the radially outward surface 13B of the shaft 13.

In the present embodiment, to help prevent or limit entry of the fluid(s) from the cavity (C) into the rotational gap 38, the seal runner 26 defines a groove 40 in its radially inner surface 26C. The groove 40 extends circumferentially around the radially inner surface 26C of the seal runner 26 and receives therein an annular seal 42. The annular seal 42 contacts the radially outward surface 13B of the shaft 13 and thereby helps seal the fixed gap 36 associated with the seal runner 26. It is contemplated that a different sealing arrangement may be used.

Now referring to FIGS. 3A and 3B, in this embodiment the seal runner 26 defines circumferential slots 44 therein, only some of which are labeled to maintain clarity. In this embodiment, and although not necessarily the case in other embodiments, the circumferential slots 44 are equidistantly spaced relative to each other around the circumference 31 of the seal runner 26. As shown, in the present embodiment each of the circumferential slots 44 extends both: a) circumferentially in the seal runner 26 (i.e. along/in the circumference 31 of the seal runner 26), and b) radially (i.e. along a radial direction (XR)) through the seal runner 26.

More particularly in this embodiment, each of the circumferential slots 44 extends from a radially outer surface 26D of the seal runner 26 to the radially inner surface 26C of the seal runner 26. In an aspect, the circumferential slots 44 may help the fluid(s) circulate and for example create turbulent flows of the fluid(s) that may be present in the cavity (C) which may contact the radially outward surface 13B of the shaft 13. This may help cool the shaft and/or the seal runner 26.

Further in the present embodiment, and as best shown in FIG. 3A, portions 26' of the seal runner 26 defining the axially-extending slots 28 are radially-inwardly offset relative to portions 26" of the seal runner 26 defining the circumferential slots 44. Accordingly, when the seal runner 26 is mounted to the shaft 13, the portions 26' are radially closer to the shaft 13 than the portions 26", and thus parts of the perforated circumferential wall 30 of the seal runner 26 defines spaces 45 between the radially inner surface 26C of the seal runner 26 and the radially outward surface 13B of the shaft 13. For clarity, only some of the portions 26' and 26" have been labeled in the figures.

Still referring to FIGS. 3A and 3B, in this embodiment the circumferential slots 44 define in the seal runner 26 both axially-extending ribs 46, and circumferentially-extending ribs 48. For clarity, only some of the ribs 46 and 48 have been labeled in the figures. In the present embodiment, each given axially-extending rib 46 is disposed between a pair of adjacent axially-extending slots 28. Also in the present embodiment, and although this may be different in other embodiments, each given axially-extending rib 46 is disposed at a midpoint, relative to the circumference 31, between its respective pair of adjacent axially-extending slots 28. In some applications, and although need not be present in all embodiments, the ribs 46 and/or 48 may help maintain various functions of the contact seal assembly 20, such as helping the contact seal assembly 20 to reduce leaks for example.

To this end, when the seal runner 26 is rotated with the shaft 13 about the rotation axis 15 and a liquid, such as oil for example, is present in the cavity (C), the ribs 46 and/or 48 may impart some of the rotational forces into the flow passing through the space 45 through the circumferential slots 44, as shown with arrows 47. This may help create a turbulent flow 49 of the liquid in the spaces 45, which may provide for better cooling for example in comparison to laminar flows and/or or at least less turbulent flows of the liquid.

Further in the present embodiment, each given circumferentially-extending rib 48 connects the portion 26' of the seal runner 26 that defines one of the axially-extending slots 28 of a respective pair of adjacent axially-extending slots 28, to the portion 26' of the seal runner 26 that defines the other axially-extending slot 28 of the respective pair of adjacent slots 28. In an aspect, the ribs 48 may help provide stiffness in parts of the seal runner 26 where it may be required in some embodiments, while allowing for relatively more deformation in other parts of the seal runner 26. In some cases, the allowed deformation may be at locations that are spaced away from the front face 26A of the seal runner 26, and this may help improve or maintain the sealed rotational gap leak free in at least some operating conditions. In this embodiment, and although this may be different in other embodiments, the circumferentially-extending ribs 48 define the rear face 26A of the seal runner 26.

Figure 4:
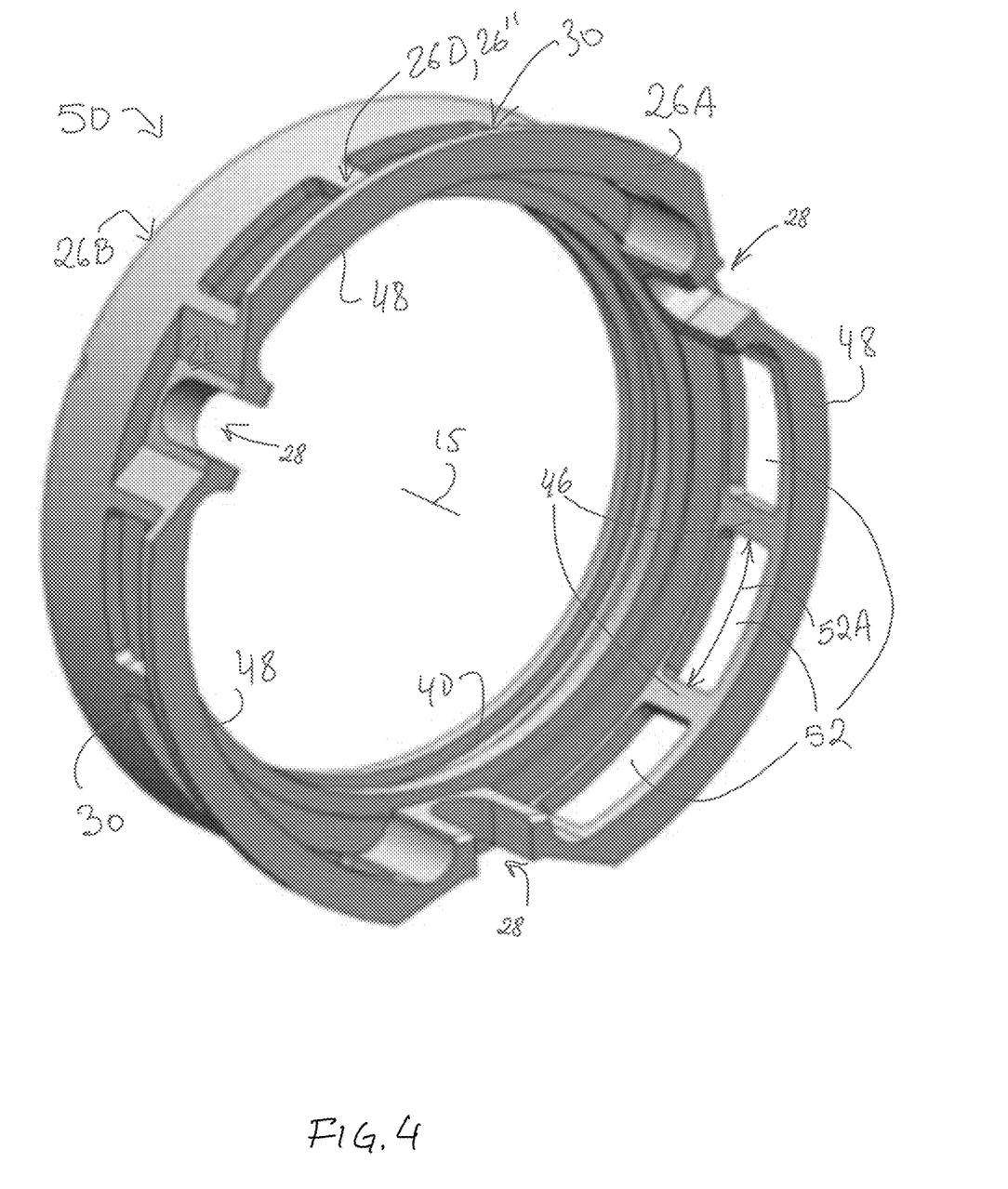
FIG. 4 is a perspective view of the seal runner of FIG. 3A, according to another embodiment.

Now referring to FIG. 4, another embodiment of a seal runner is shown at 50. In some embodiments, the seal runner 50 may be used instead of the seal runner 26. The seal runner 50 includes some of the features of the seal runner 26. Such features have been shown with the same reference numerals as were used with respect to the seal runner 26 and will not be described in detail again. A difference between the seal runner 50 and the seal runner 26 is that the seal runner 50 includes three circumferential slots 52 between each pair of adjacent axially-extending slots 28.

Only some of the circumferential slots 52 have been labeled to maintain clarity of the figure. As shown, each set of three circumferential slots 52 between a given pair of adjacent axially-extending slots 28 defines two axially-extending ribs 46. In this embodiment, and although this need not be the case in other embodiments, each set of two axially-extending ribs 46 is spaced equidistantly from the respective pair of adjacent axially-extending slots 28, and the circumferential slots 52 all have one and the same circumferential length 52A.

Figure 5:
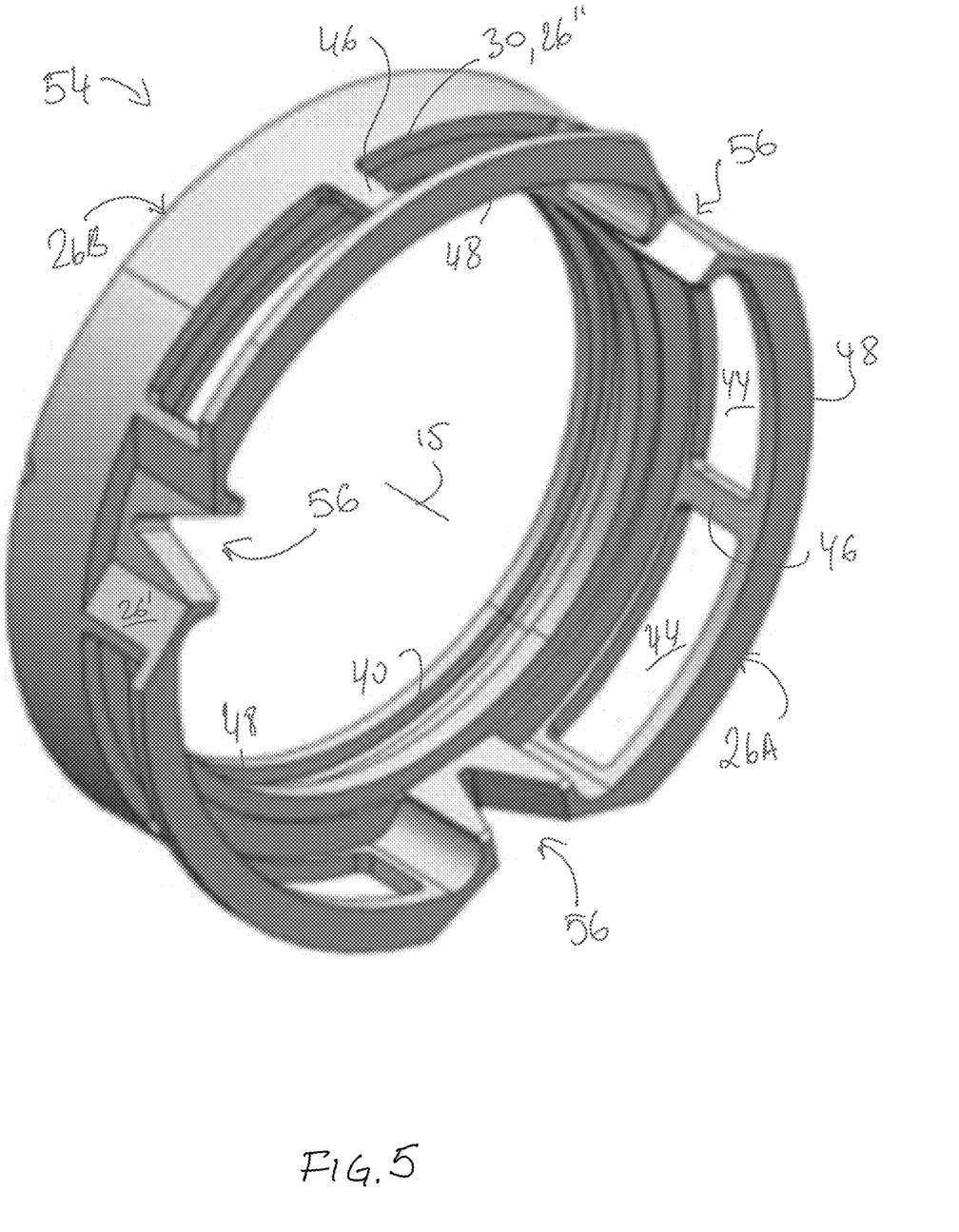
FIG. 5 is a perspective view of the seal runner of FIG. 3A, according to another embodiment.

Now referring to FIG. 5, another embodiment of a seal runner is shown at 56. The seal runner 56 includes some of the features of the seal runner 26. Such features have been shown with the same reference numerals as were used with respect to the seal runner 26 and will not be described in detail again. A difference between the seal runner 56 and the seal runner 26 is that the axially-extending slots 56 of the seal runner 56 are V-shaped.

Figure 6:
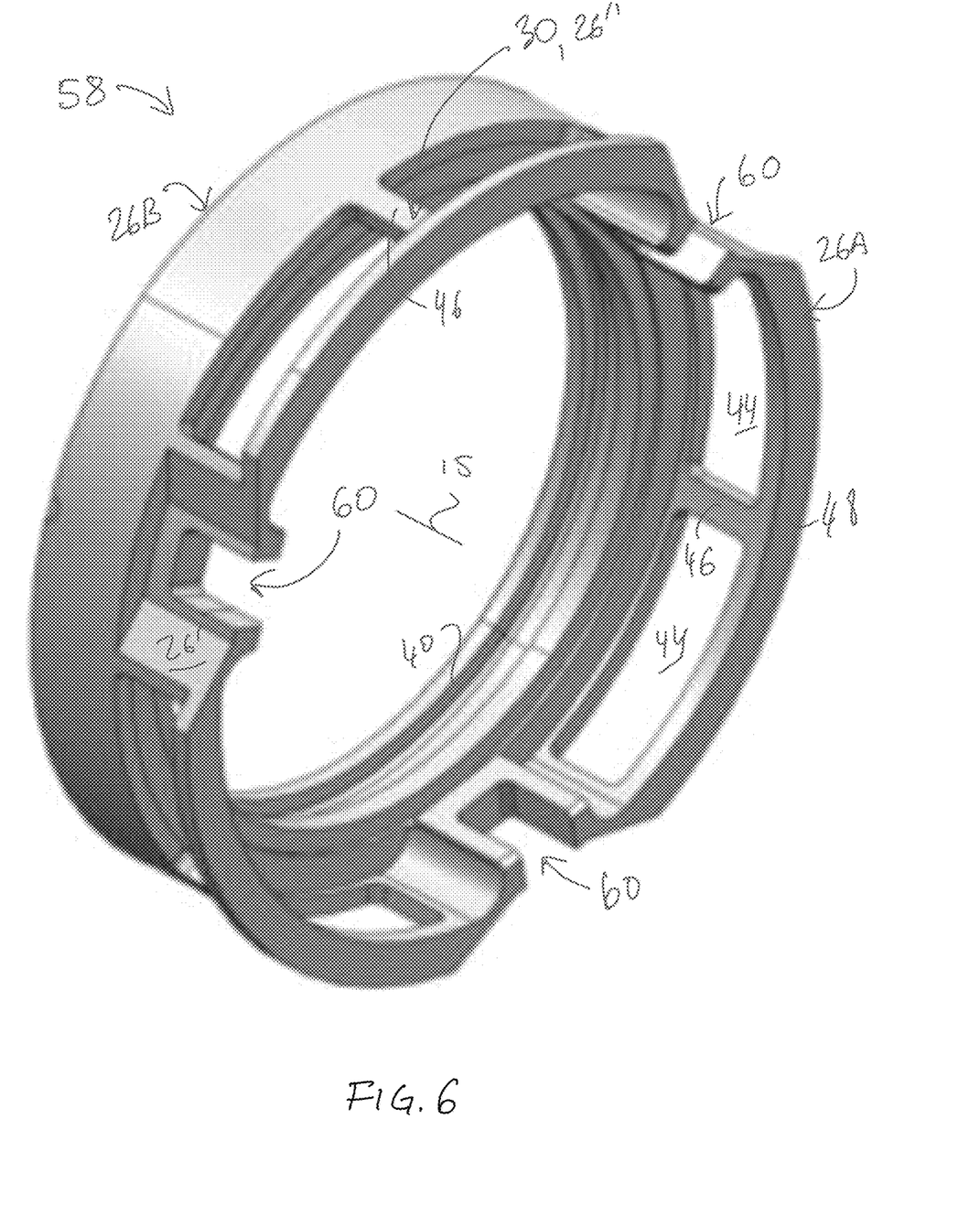
FIG. 6 is a perspective view of the seal runner of FIG. 3A, according to another embodiment.

Now referring to FIG. 6, another embodiment of a seal runner is shown at 58. The seal runner 58 includes some of the features of the seal runner 26. Such features have been shown with the same reference numerals as were used with respect to the seal runner 26 and will not be described in detail again. A difference between the seal runner 60 and the seal runner 26 is that the axially-extending slots 60 of the seal runner 58 are rectangular.

Figure 7:
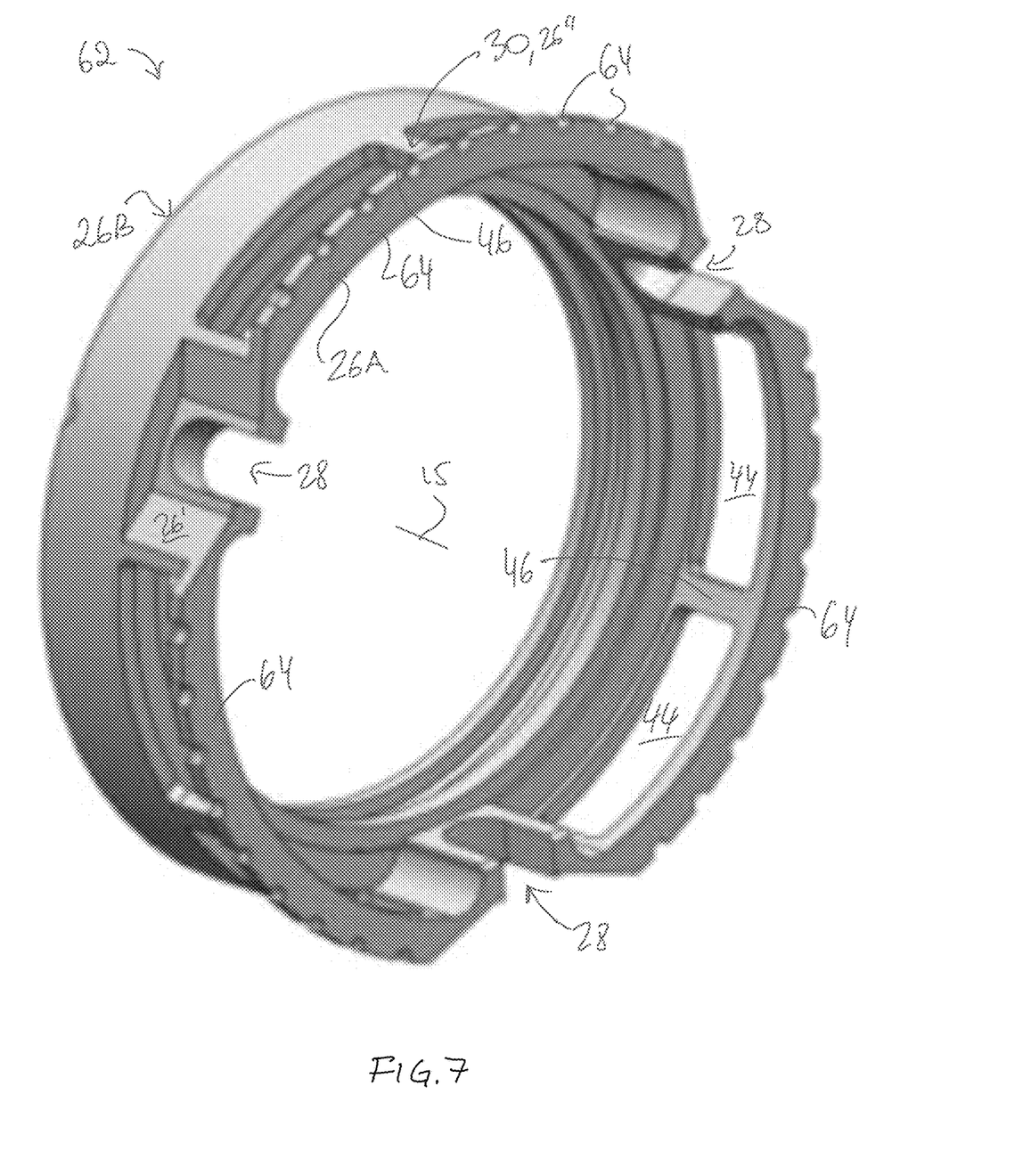
FIG. 7 is a perspective view of the seal runner of FIG. 3A, according to another embodiment.

Now referring to FIG. 7, another embodiment of a seal runner is shown at 62. The seal runner 62 includes some of the features of the seal runner 26. Such features have been shown with the same reference numerals as were used with respect to the seal runner 26 and will not be described in detail again. A difference between the seal runner 62 and the seal runner 26 is that the circumferentially-extending ribs 64 of the seal runner 62 define notches 64 therein. Only some of the notches 64 have been labeled to maintain clarity of the figure. The notches 64 help reduce stiffness of the circumferentially-extending ribs 64 and/or parts of the seal runner 62 defining the front face 26B of the seal runner 62. In an aspect, this may help reduce or prevent warping of the front face 26B in at least some operating conditions.

Figure 8:
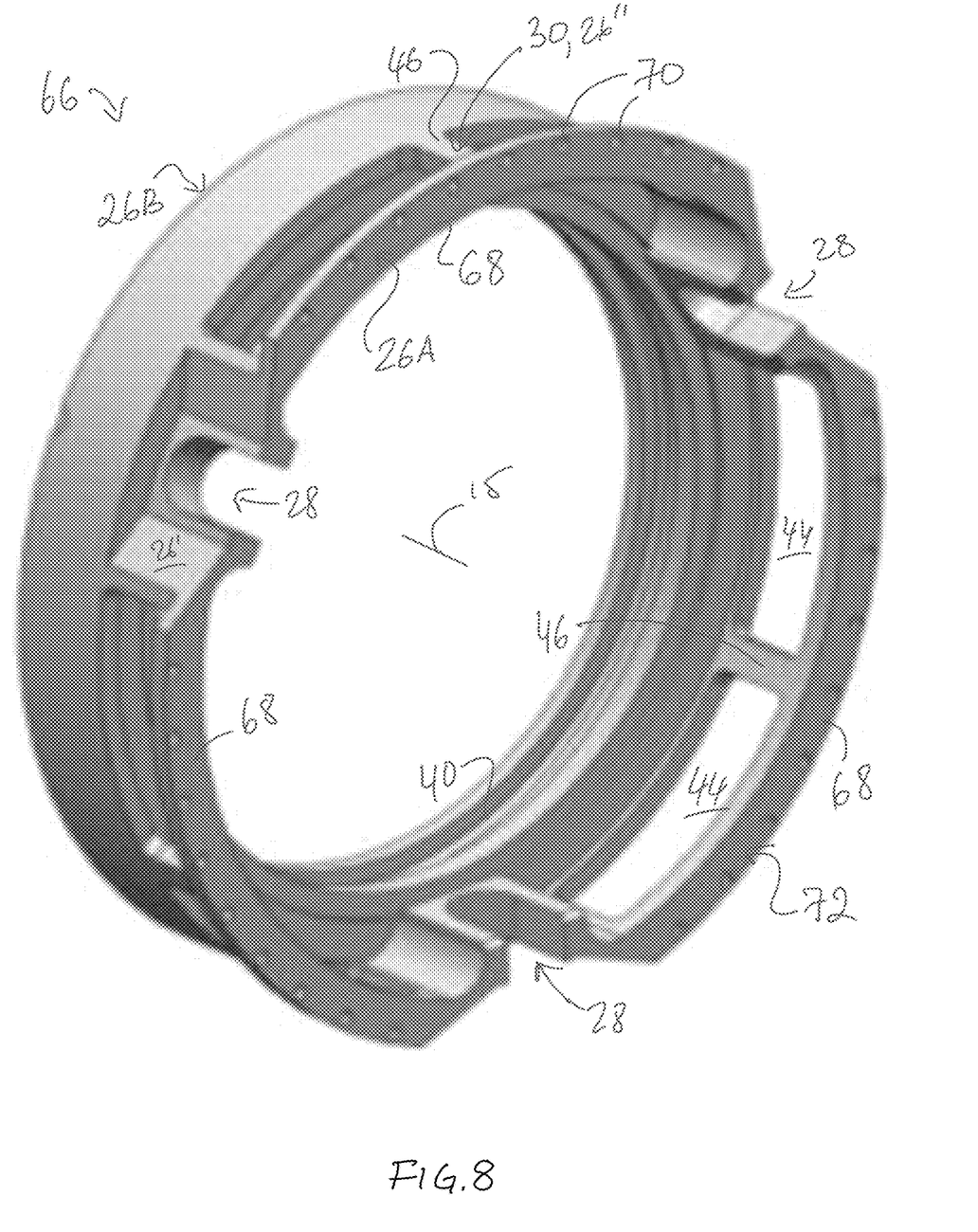
FIG. 8 is a perspective view of the seal runner of FIG. 3A, according to another embodiment.

Now referring to FIG. 8, another embodiment of a seal runner is shown at 66. The seal runner 66 includes some of the features of the seal runner 26. Such features have been shown with the same reference numerals as were used with respect to the seal runner 26 and will not be described in detail again.

A difference between the seal runner 66 and the seal runner 26 is that the circumferentially-extending ribs 68 of the seal runner 66 define indents 68 therein, in this embodiment in the rear face 72 of the seal runner 66, and in an outer radial surface. Only some of the indents 68 have been labeled to maintain clarity of the figure. The indents 68 help reduce stiffness of the circumferentially-extending ribs 68 and/or parts of the seal runner 62 at locations away from the front face 26B of the seal runner 62. In an aspect, this may help reduce or prevent warping of the front face 26B in at least some operating conditions.

With the various non-limiting embodiments described above in mind, the present technology further provides a method of manufacturing a seal runner, such as one of the seal runners 26, 50, 54, 58, 62, 66 described above for example. The method may include a step of forming an annular body, such as one of the annular bodies 26, 50, 54, 58, 62, 66 of the seal runners 26, 50, 54, 58, 62, 66, which may have a planar annular front face 28B and an annular rear face 28A opposite the front face 28B. The method may also include a step of forming in the annular body 26, 50, 54, 58, 62, 66 a plurality of axially-extending slots, such as one or more of the axially-extending slots 28, 56, 60, that are open at the rear face 28A and distributed about a circumference 31 of the annular body 26, 50, 54, 58, 62, 66.

In some such cases, the axially-extending slots 28, 56, 60 may be distributed at equidistant locations about the circumference 31. The method may also include a step of forming in the circumference 31 of the annular body 26, 50, 54, 58, 62, 66 a plurality of circumferential slots, such as the slots 44 and/or 52 for example, between adjacent ones of the axially-extending slots 28 and extending: a) circumferentially (XC) in the annular body 26, 50, 54, 58, 62, 66, and b) radially (XR) through the annular body 26, 50, 54, 58, 62, 66. As an example, the various steps of this method may be performed using conventional manufacturing techniques and conventional material(s) selected to suit each particular intended application, and may be performed in any order that may be suitable for the selected manufacturing technique(s).

Referring back to FIG. 2, the present technology further provides a method of sealing an gap (IN) between: a) a part 10P of a machine, such as the engine 10 or a starter/alternator for example, which defines a cavity (C), and a shaft of the machine, such as the shaft 11 or 13 for example, which rotates about a respective rotation axis 15 and extends through the part 10P of the machine 10 into the cavity (C). In some such cases, the cavity (C) may contain a liquid such as an oil which may be stored in the cavity (C) and/or circulated through the cavity (C). In the example of the engine 10, the liquid may be the engine's 10 oil circulating through the cavity (C) for, inter alia, lubricating bearings (B) and/or other parts of the engine 10 as may be required given each particular embodiment of the engine 10.

In some embodiment, this method may include a step of rotating an annular seal runner, such as a given seal runner 26, 50, 54, 58, 62, 66 described above, with the shaft 11/13 about the shaft's rotation axis 15 against a carbon seal, such as the carbon seal 22, engaged to the part 10P of the machine 10. In the example of the engine 10, this may be done by driving the shaft 11/13 with the engine 10 while the seal runner 26 is non-rotationally secured to the shaft 11/13. As seen above, this may maintain a sealed rotational gap, such as may be defined by a combination of the gaps 32 and (IN) for example, between the shaft 13 and that part 10P of the machine 10. The method may also include a step of creating a turbulent flow of the liquid in a space 45 between a radially outer surface 13B of the shaft 13 and a radially inner surface 26C of the annular seal runner 26.

As seen above with respect to FIG. 2, in some embodiments the turbulent flow 49 may be created, or at least intensified, by imparting some of the rotational forces/inertia of the shaft 13 into liquid flowing through the space 45 via ribs 46 and/or 48 of the seal runner 26. To this end, the ribs 46/48 may be examples of flow agitators. It is contemplated that the seal runner 26 may include other flow agitators, either instead of or in combination with the ribs 46 and/or 48 for carrying out at least this function/step. In at least some applications and operating conditions, this method of operation may help keep the seal runner(s) 26, 50, 54, 58, 62, 66 and/or the carbon seal(s) 22 cooler and may help prevent warping and hence leakage thereof. Also as seen above, in some embodiments the step of creating the turbulent flow 49 may include moving at least some the liquid through the space 45 through a circumferential wall 30 of the seal runner 26, and thus moving at least some of the liquid along a radially-extending surface of the circumferential wall 30, such as via the circumferential slots 44 along one or more radially-extending surfaces of the circumferential slots 44 for example.

In another aspect, the present technology provides a method for sealing a gap between a part of a machine, such as the engine 10, and a rotatable shaft of the machine, such as the shaft 11 and/or 13 for example. In some embodiments, the method includes rotating the shaft 11/13, contacting a front annular face 26B of a seal runner, such as one of the seal runners 26, 50, 54, 58, 62 and 66, against a wear seal 22 to seal the gap, and spreading a load on the seal runner 26, 50, 54, 58, 62, 66 from the shaft 11/13 via annular segments of the seal runner 26, 50, 54, 58, 62, 66 extending at least in part around the shaft 11/13 and separated by axially-oriented slots 28 at a rear portion of the seal runner 26, 50, 54, 58, 62, 66. In some embodiments, this method may include unstiffening the front annular face 26B of the seal runner 26, 50, 54, 58, 62, 66 with the axially-oriented slots 28. In an aspect, this method may help dissipate heat from the front annular face 26B of the seal runner 26, 50, 54, 58, 62, 66 and may help prevent warping of the front annular face 26B during at least some rotational speeds of the shaft 11/13 at which prior art seal runner assemblies made of the same materials and applied in the same location may experience warping of the front annular face of the prior art seal runners.

The above description is meant to be exemplary only, and one skilled in the art will recognize that changes may be made to the embodiments described without department from the scope of the technology disclosed. The engine 10 or other machine in which the contact seal assemblies 20 of the present technology may be used, except as described herein, may be conventional.

For example, while the contact seal assembly 20 has been described above as having particular sets of features in its various embodiments and when using various ones of the seal runners 26, 50, 54, 58, 62, 66, in other embodiments the contact seal assembly 20 need not have all of these features. As another example, in some embodiments a contact seal assembly implemented according to the present technology may have a combination of one or more of the features of the various embodiments of the contact seal assembly 20, but not necessarily all of the features of a given embodiment of the contact seal assembly 20 described above.

As another example, in some embodiments, a given seal runner 26, 50, 54, 58, 62, 66 may have a different number of and/or a different relative positioning of the various possible slots 28, 44, 52 and/or other features. As yet another example, while providing advantages in the above embodiments, in other embodiments the circumferential slots 44, 52 may be omitted.

As yet another example, while the circumferential wall 30 in the above embodiments extends around an entirety of the circumference 31 of the seal runner 26, in other embodiments this may not be the case. As yet another example, in some embodiments the spring 24A may be positioned between the shaft 13 and the seal runner 26 to bias the seal runner 26 against the carbon seal 22.

Still other modifications which fall within the scope of the present technology will be apparent to those skilled in the art, in light of a review of this disclosure, and such modifications are intended to fall within the appended claims.

The invention claimed is:

1. A seal runner assembly for a gas turbine engine, comprising:
   a non-rotational annular wear seal; and
   an annular seal runner having an annular body defining an annular front face contacting the wear seal, the annular body defining an aperture extending axially through the seal runner, the aperture configured for receiving therein a part of a shaft of the gas turbine engine, the seal runner having a plurality of axially-extending slots at locations that are distributed around a wall of the seal runner, the wall extending circumferentially about at least a portion of the annular front face and extending from the front face in a direction away from the wear seal, the seal runner having a circumferential slot extending through the wall and disposed between an adjacent pair of the axially-extending slots.

2. The seal runner assembly of claim 1, wherein the wall is an annular wall that defines the circumferential slot extending: a) circumferentially in the annular wall, and b) radially through the annular wall.

3. The seal runner assembly of claim 1, wherein the axially-extending slots are open at a rear face of the annular body, the rear face being opposite the front face.

4. The seal runner assembly of claim 1, wherein the circumferential slot is a plurality of circumferential slots that define in the wall at least one of: axially-extending ribs, and circumferentially-extending ribs.

5. The seal runner assembly of claim 4, wherein a given axially-extending rib of the axially-extending ribs is disposed between a pair of adjacent axially-extending slots of the axially-extending slots, and a given circumferentially-extending rib of the circumferentially-extending ribs connects a portion of the seal runner defining a first axially-extending slot of the pair of adjacent axially-extending slots to a portion of the seal runner defining a second axially-extending slot of the pair of adjacent axially-extending slots.

6. The seal runner assembly of claim 4, wherein the circumferentially-extending ribs define a rear face of the seal runner.

7. The seal runner assembly of claim 1, wherein the seal runner has a depth defined between the front face and a rear face of the seal runner, and the axially-extending slots have an axial length that is between 20% and 70% of the depth.

8. The seal runner assembly of claim 1, wherein portions of the wall of the seal runner defining the axially-extending slots are radially-inwardly offset relative to portions of the wall of the seal runner defining the circumferential slots.

9. The seal runner assembly of claim 1, wherein a given axially-extending slot of the axially-extending slots is one of: U-shaped, V-shaped, and rectangular.

10. The seal runner assembly of claim 4, wherein:
    the axially-extending slots are equidistantly spaced relative to each other around the circumference of the seal runner, and
    the circumferential slots are equidistantly spaced relative to each other around the circumference of the seal runner.

11. A machine, comprising:
    a shaft rotatable about a rotation axis relative to a part of the machine;
    a non-rotational annular wear seal; and
    an annular seal runner having an annular body defining an annular front face contacting the wear seal, the annular body defining an aperture extending axially through the seal runner, the aperture receiving the shaft therein, the seal runner defining therein a plurality of axially-extending slots at locations that are distributed around a circumference of the seal runner, the axially-extending slots matingly receiving respective parts of the shaft therein.

12. The machine of claim 11, wherein the annular seal runner includes a circumferential wall extending at least in part around the shaft and defines a circumferential slot in the circumferential wall, the circumferential slot extending: a) circumferentially in the circumferential wall, and b) radially through the circumferential wall.

13. The machine of claim 11, wherein at least a part of the annular seal runner is mounted over the shaft coaxially with the shaft, and further comprising an annular seal disposed between the at least a part of the annular seal runner and the shaft.

14. The machine of claim 11, further comprising axially-extending ribs disposed between the axially-extending slots.

15. The machine of claim 14, wherein the annular seal runner includes a rear face opposite the front face, and the axially-extending slots are open at the rear face.

16. The machine of claim 15, further comprising ribs extending circumferentially between the axially-extending slots.

17. The machine of claim 12, wherein the circumferential slot is a plurality of circumferential slots, a given circumferential slot of the circumferential slots being disposed between adjacent ones of the axially-extending slots.

18. The machine of claim 12, wherein at least a part of the circumferential wall defines a space between a radially outer surface of the shaft and the part of the circumferential wall.

19. A method for sealing a gap between a part of a machine and a rotatable shaft of the machine, comprising:
    rotating the shaft;
    contacting a front annular face of a seal runner against a wear seal to seal the gap; and
    spreading a load on the seal runner from the shaft via annular segments of the seal runner extending at least in part around the shaft and separated by axially-oriented slots, the annular segments having a circumferential slot extending through the annular segments and disposed between an adjacent pair of the axially-oriented slots.

20. The method of claim 19, comprising unstiffening the front annular face of the seal runner with the axially-oriented slots.

* * * * *